E. OLIVER.
SPLIT DEMOUNTABLE RIM.
APPLICATION FILED OCT. 22, 1919.
1,341,926.
Patented June 1, 1920.
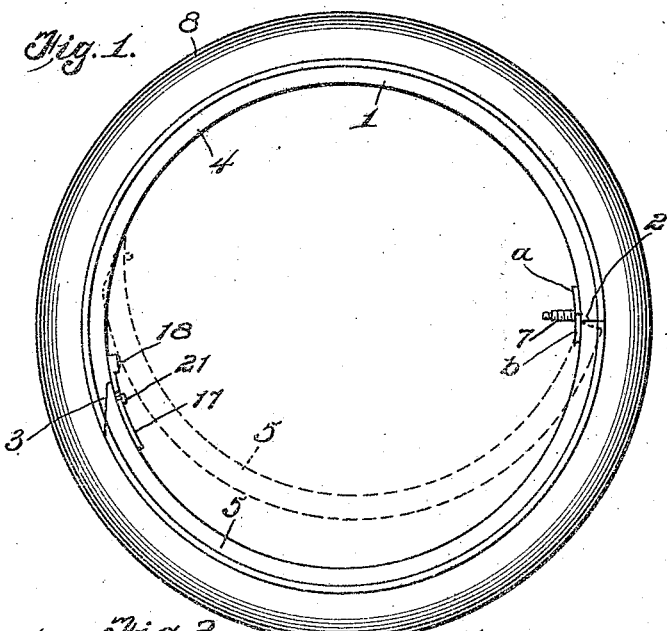
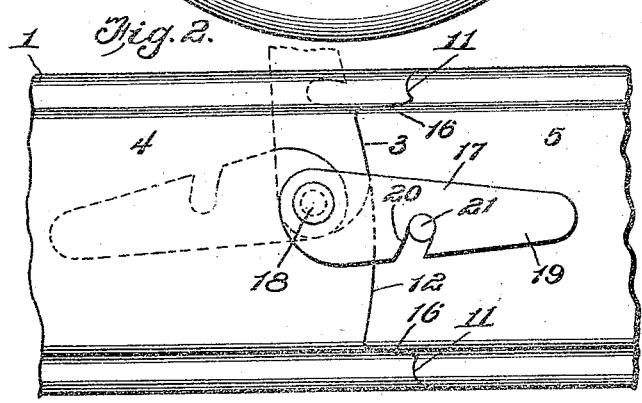
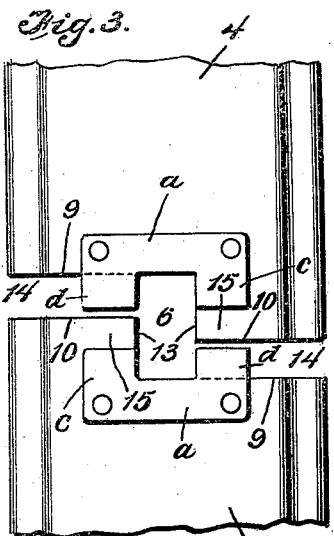
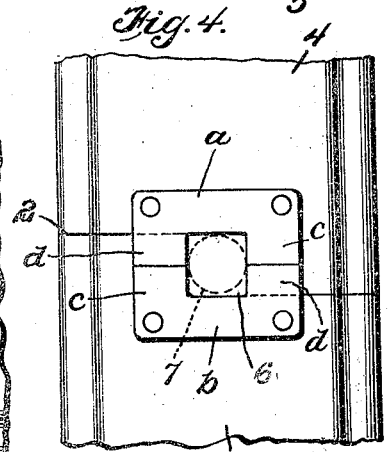
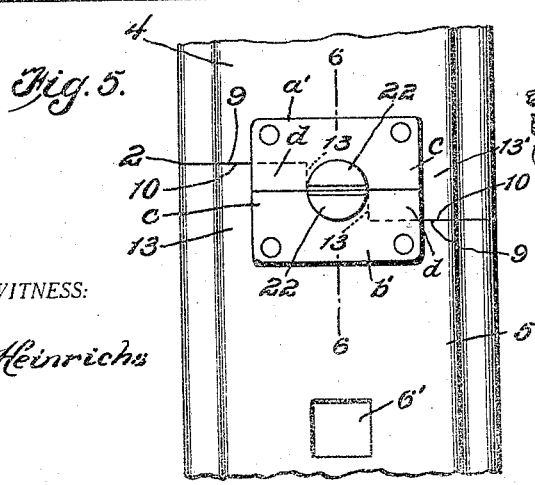
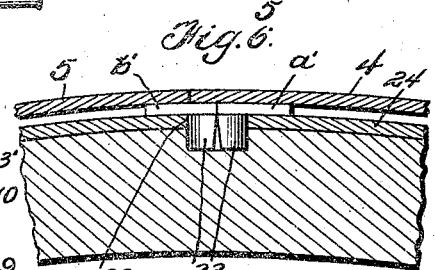
WITNESS:
C. R. Heinrichs
INVENTOR.
Elmer Oliver
BY
ATTORNEY.

UNITED STATES PATENT OFFICE.

ELMER OLIVER, OF DAYTONA, FLORIDA.

SPLIT DEMOUNTABLE RIM.

1,341,926.　　　　Specification of Letters Patent.　　Patented June 1, 1920.

Application filed October 22, 1919.　Serial No. 332,371.

*To all whom it may concern:*

Be it known that I, ELMER OLIVER, a citizen of the United States, residing at Daytona, in the county of Volusia and State of Florida, have invented new and useful Improvements in Split Demountable Rims, of which the following is a specification.

This invention relates to split demountable rims for automobiles and like vehicle wheels, and particularly to improvements in split rims of the type shown in my prior Patent No. 1,293,893, dated February 11, 1919.

In my aforesaid patent I have shown a rim transversely divided to provide two sections—a body section and a detachable or removable section. These sections have a sliding and pivotal interlocking and bracing connection at one end and a coupling connection at the opposite end, said coupling connection including a suitable locking lever and stud. The interlocking connection referred to comprises interfitting and abutting elements adapted to permit the detachable section to be pivotally adjusted to certain locking and releasing positions, while at the same time holding the interlocking ends against lateral and radial inward and outward movements when the rim sections are assembled.

The object of my present invention is to provide improved constructions of the interlocking ends of the rim sections whereby to permit of certain specified functions and uses of the rim, such as the formation of an opening for the passage of the valve stem of the tire or the arrangement of an anti-creeping stud to engage a socket in the wheel rim, without in any manner impairing the locking and bracing efficiency of the interlocking elements.

The invention consists of the features of construction, combination and arrangement of parts, hereinafter fully described and claimed, reference being had to the accompanying drawing, in which:—

Figure 1 is a side elevation of a demountable rim embodying my invention and showing a tire mounted thereon.

Fig. 2 is a view on an enlarged scale looking toward the inner side of the coupling ends of the rim sections and showing the same coupled.

Fig. 3 is a similar view of the interlocking ends of the rim sections, showing the same disconnected.

Fig. 4 is a view similar to Fig. 3 of the interlocking ends of the rim, showing the same interlocked.

Fig. 5 is a view similar to Fig. 4, showing a modification in the abutment members on the interlocking rim ends.

Fig. 6 is a section on line 6—6 of Fig. 5.

Referring to the drawing, 1 designates a demountable rim of the split sectional ring type, said rim being severed transversely at the points 2 and 3 to divide the rim into two sections 4 and 5, which, for convenience of description, may be termed the body section and the detachable or removable section, respectively. The rim 1 is provided, in the construction shown in Figs. 1, 3 and 4, with openings 6 for passage of the valve stem 7 of the pneumatic tire 8, which, in this form of the invention is shown as located between the walls of the split 2, while, in the form of my invention shown in Figs. 5 and 6, the valve stem opening 6' is formed in one of the rim sections at a point adjacent to but at a distance from the split 2. It will be observed from the foregoing that the rim is divided by the splits or clefts 2 and 3 into two unequal rim sections, the section 5 being relatively smaller than the section 4. This division of the rim into a relatively larger body section and smaller detachable or removable section is preferred, in order to facilitate the handling of the section 5 in assembling and disassembling said rim sections, although such dimensioning of the rim sections is not absolutely essential.

The split 2 is radial to the axis of the rim and extends straight across the rim so as to provide straight or square abutment edges 9 and 10 at the adjacent ends of the rim, while the split 3 extends tangentially or at an oblique angle across the rim so as to provide beveled abutment surfaces 11 and straight or radial transverse abutment surfaces 12 at the adjacent ends of the rim. The abutment surfaces 9 and 10 are designed to provide, in conjunction with other features, a rigid lock joint at the point 2, which will normally prevent lateral or longitudinal (circumferential) movement of either rim section, and will permit of the rim section 5 being applied and removed by sliding and pivotal motion at a prescribed angle, while the abutment surfaces 11 are designed to provide sloping faces which will ride easily upon each other to facilitate the connection and disconnection of the rim section 5, and the abutment surfaces 12 form square shoulders to hold the rim ends from accidentally slipping when expanded and locked together.

The split 2 is on an irregular transverse line, so cut that one of the edges 9 and 10 lies in advance of the other, the edge 9 being of greater width than the edge 10 and such edges intersecting at their inner ends a straight longitudinal edge 13. By this construction the ends of the rim sections at the point 2 are each provided with a receding edge forming a recess 14 and a projecting edge 10 forming a tongue 15 projecting beyond the line of the edge 9, such recess being of somewhat greater width than the tongue. When the edges at the point 2 are engaged and interlocked the edge portions 9 and 10 thus abut, while the edge portions 13 are spaced sufficiently to form the opening 6 for the passage of the valve stem 7, such construction thus providing for the passage of the valve stem in rim constructions where the stem extends through the rim 1 at the point of formation of the split 2.

Riveted or otherwise secured to the interlocking ends at the point 2 are abutment and lap plates $a$ and $b$, each of which is substantially U-shaped and consists of a transverse body portion having projecting arms $c$ and $d$. The arms $c$ of each abutment plate projects beyond the edge 9 over upon the tongue 15 and terminates inwardly of the edge 10 of said tongue, while the arm $d$ projects beyond the edge wall 9 of the recess 14 a like distance, the said arms $c$ and $d$ being of equal length and projecting beyond the edge 9 a distance substantially equal to one-half the length of the tongue 15. By this construction when the edges 9 and 10 are brought into abutting relation, the free edges of the opposed sets of arms $c$ and $d$ will abut against each other and the projecting arms $d$ will lap over the tongues 15, thus bridging over the joint. As shown, the plates $a$ and $b$ are arranged upon the inner face of the rim, and thus it will be apparent that the edges 9 and 10 will hold the rim sections against relative circumferential movement, while the edge walls 13 and inner edges of the arms $c$ and $d$ will form the valve stem opening 6 and engage the valve stem and hold the rim ends against lateral motion, while the lapping arms $d$ will hold the rim ends against inward radial motion, the pressure of the tire holding said rim ends against outward radial motion, thus making the joint at the point 2 absolutely rigid, as will be readily understood.

The rim section 5 is adapted to be applied and removed by sliding and pivotal motion, in which the end of said rim section 5 at the joint 2 is adapted to slide in and out beneath the arms $d$ and to swing in engagement therewith so that the rim section 5 may be pivotally swung within the circumference of the rim, as shown in dotted lines in Fig. 1, in an arc between positions eccentric to and concentric with the rim axis, for disposing said rim section 5 in position for disconnection and to complete the rim formation, as described in my aforesaid Patent No. 1,293,893. In this operation the surfaces 11 have sliding engagement and the surfaces 12 abut to lock the rim ends at the point 3 against longitudinal or circumferential motion, shoulders 16 being provided between the portions 11 and 12 to lock the rim ends against lateral or transverse motion when connected. For the purpose of connecting and holding the rim ends at the point 3 normally against movement in any direction, an eccentric fastening lever 17 is provided which is pivotally mounted at one end as indicated at 18, upon the end of the section 4 and has its opposite end arranged to form a handle 19 which is adapted, when the lever is in fastening position, to extend longitudinally of the rim and overlap the end of the rim section 5, thus holding the two sections at the point 3 against sliding movements. The lever is provided in one of its edges with an inclined or cam slot 20 adapted to receive and engage a locking pin or stud 21 on the end of the rim section 5, whereby the lever will be frictionally held in fastening position, the cam form of the slot also serving in the locking movement of the lever to draw the abutment surfaces 11 and 12 of the rim sections together to make the joint 3 absolutely rigid and secure. When the section 5 is disposed in the dotted line position shown in Fig. 1, suitable pressure upon the end thereof provided with the pin 21 will bring the surfaces 11 of the rim ends of the coupling joint into engagement for coupling connection, as fully and clearly described in my aforesaid patent.

In the modified form of my invention shown in Figs. 5 and 6, the construction is substantially the same as that previously described, except that the edges 9 and 13 are shortened and a short tongue or projection 12' provided at the center of each rim section which has a straight transverse edge extending between the edge 13 and another longitudinal edge portion 13' connecting said straight transverse edge with the edge 9, and the abutment plates $a'$ and $b'$ are correspondingly formed. By this construction the central straight transverse edges of the rim ends and the corresponding transverse edges of the abutment plates come in abutting contact when the rim ends are in engagement, and each longitudinal edge 13 engages the adjacent longitudinal edge 13', such edges 13 and 13' holding the rim ends against lateral movement. This construction is employed where the valve stem opening 6' is located at a distance from the split 2 but under conditions where it is desired to provide at the point of the split means to engage with a recess in the fixed rim to hold the demountable rim from creeping movement. The central portions of the plates a and b are correspondingly provided with counterpart lug sections or bosses 22, coöperating to form a lug or stud to seat within a recess 23 in the fixed rim 24. The inner faces of these lug sections are beveled to allow them to have relative pivotal motion in the operation of applying and removing the rim section 5, as will be readily understood from the foregoing description.

Having thus fully described my invention, I claim:—

1. A trans-split demountable rim comprising sections having interlocking ends, each of such ends being cut away on one side of its center to provide a recess and having a projecting portion on the opposite side of its center, the recess of each section receiving the tongue of the other section, and U-shaped abutment plates upon the inner face of each section, each comprising a body portion secured to the rim section and arms projecting therefrom, one of said arms projecting beyond the edge wall of the recess at one side of said section and the other arm projecting over upon and terminating short of the edge of the tongue of said section.

2. A trans-split demountable rim comprising sections having interlocking ends, each of such ends being cut away on one side of its center to provide a recess and having a projecting portion on the opposite side of its center, the recess of each section receiving the tongue of the other section, and U-shaped abutment plates upon the inner face of each section, each comprising a body portion secured to the rim section and arms projecting therefrom, one of said arms projecting beyond the edge wall of the recess at one side of said section and the other arm projecting over upon and terminating short of the edge of the tongue of said section, the inner longitudinal edges of the said interlocking ends and the arms of the abutment plates being spaced to provide a passage through the rim at the center of the joint.

3. A trans-split demountable rim having end portions separated by a split extending on an irregular line across the rim, said split providing reversely arranged intermating tongues and recesses at opposite sides of the circumferential center of the rim, and abutment plates upon said rim ends each having a portion extending beyond the recess of the rim end to which it is attached, said plates being arranged to overlap the joints between the edges of the tongues and recesses.

In testimony whereof I affix my signature.

ELMER OLIVER.